(12) United States Patent
Hwang et al.

(10) Patent No.: US 8,498,498 B2
(45) Date of Patent: Jul. 30, 2013

(54) APPARATUS AND METHOD OF OBTAINING HIGH RESOLUTION IMAGE

(75) Inventors: Kyu Young Hwang, Suwon-si (KR); Chang Hyun Kim, Cheongju-si (KR); Kyu Ha Choi, Incheon (KR); Jong Beom Ra, Daejeon (KR)

(73) Assignees: Samsung Electronics Co., Ltd., Suwon-Si (KR); Korea Advanced Institute of Science and Technology, Daejeon (KR)

( * ) Notice: Subject to any disclaimer, the term of this patent is extended or adjusted under 35 U.S.C. 154(b) by 1064 days.

(21) Appl. No.: 12/457,170

(22) Filed: Jun. 2, 2009

(65) Prior Publication Data

US 2010/0079609 A1   Apr. 1, 2010

(30) Foreign Application Priority Data

Sep. 30, 2008   (KR) ......... 10-2008-0095718

(51) Int. Cl.
*H04N 5/228* (2006.01)

(52) U.S. Cl.
USPC ....................................... 382/284

(58) Field of Classification Search
None
See application file for complete search history.

(56) References Cited

FOREIGN PATENT DOCUMENTS

| JP | 2005-176339 | 6/2005 |
|---|---|---|
| JP | 2006-014121 | 1/2006 |
| JP | 2007-280202 | 10/2007 |
| JP | 2007-311924 | 11/2007 |
| JP | 2007-312399 | 11/2007 |
| JP | 2008-091979 | 4/2008 |
| JP | 2008-129864 | 6/2008 |
| KR | 10-2003-0048719 | 6/2003 |
| KR | 10-2004-0056996 | 7/2004 |

OTHER PUBLICATIONS

Demirel, H. "Motion-based localized super resolution technique for low resolution video enhancement",16th European Signal Processing Conference (EUSIPCO 2008), Lausanne, Switzerland, Aug. 25-29, 2008.*
Schoenemann, T.; Cremers, D.; , "High resolution motion layer decomposition using dual-space graph cuts," Computer Vision and Pattern Recognition, 2008. CVPR 2008. IEEE Conference on , vol., no., pp. 1-7, Jun. 23-28, 2008 doi: 10.1109/CVPR.2008.4587445 URL: http://ieeexplore.ieee.org/stamp/stamp.jsp?tp=&arnumber=4587445&isnumber=4587335.*
Jiji, C. V. "Single-frame image super-resolution using learned wavelet coefficients", International Journal of Imaging Systems and Technology, 2004. Wiley Subscription Services, Inc., A Wiley Company.*
Demirel, H. "Motion-based localized super resolution technique for low resolution video enhancement", 16th European Signal Processing Conference (EUSIPCO 2008), Lausanne, Switzerland, Aug. 25-29, 2008.*
B. Ugur Toreyin, A. Enis Ç etin, Anil Aksay, M. Bilgay Akhan, Moving object detection in wavelet compressed video, Signal Processing: Image Communication, vol. 20, Issue 3, Mar. 2005, pp. 255-264, ISSN 0923-5965.*

* cited by examiner

*Primary Examiner* — Claire X Wang
*Assistant Examiner* — Thomas A James
(74) *Attorney, Agent, or Firm* — Staas & Halsey LLP

(57) ABSTRACT

Disclosed is a high resolution image obtaining apparatus and method. The high resolution image obtaining apparatus may divide an input image frame into a background region and foreground region and apply an optimized resolution enhancement algorithm to each region, thereby effectively obtaining a high resolution image frame with respect to the input image frame.

15 Claims, 6 Drawing Sheets
(3 of 6 Drawing Sheet(s) Filed in Color)

APPARATUS AND METHOD OF OBTAINING HIGH RESOLUTION IMAGE

CROSS-REFERENCE TO RELATED APPLICATIONS

This application claims the benefit of Korean Patent Application No. 10-2008-0095718, filed on Sep. 30, 2008, in the Korean Intellectual Property Office, the disclosure of which is incorporated herein by reference.

BACKGROUND

1. Field

Embodiments relate to a high resolution image obtaining apparatus and method, and more particularly, to a high resolution image obtaining apparatus and method that may reduce complexity and effectively obtain a high resolution image frame with respect to an input image frame.

2. Description of the Related Art

In the case of recording an image through using a digital camera or a digital video recorder, there may be difficulty in storing a high resolution image due to an optical limit caused by miniaturization of a camera, namely, limit of spatial resolution caused by an insufficient number of pixels of a charge-coupled device (CCD)/complementary metal-oxide semiconductor (CMOS) image sensor and size variation during compressing/storing/transmitting of a recorded image. Accordingly, to obtain a high resolution image with respect to the recorded image, a high resolution image enhancement algorithm through signal analysis may be developed.

As an existing method of obtaining a high resolution image from a low resolution image, there are a sharpening method, an interpolation method, a super-resolution method, etc.

The sharpening method improves visibility of an image and improves resolution of the image using a differential operation or a high-pass emphasis filter.

The interpolation method assigns proper data values to pixels (referred to as a hole) that do not have an assigned pixel value to improve resolution of an image.

The super-resolution method provides a relatively higher resolution image than the above-mentioned methods. Representative examples are a reconstruction-based resolution enhancement algorithm and an example-based resolution enhancement algorithm.

The reconstruction-based resolution enhancement algorithm generates a high resolution image using many layers of an image frame. However, the reconstruction-based resolution enhancement algorithm is unsuitable for a general image having complex motion of an object.

The example-based resolution enhancement algorithm may obtain a high resolution image from a single image frame. However, the example-based resolution enhancement algorithm may be weak against noise and undesired artifacts may be generated.

SUMMARY

Additional aspects and/or advantages will be set forth in part in the description which follows and, in part, will be apparent from the description, or may be learned by practice of the invention.

The foregoing and/or other aspects are achieved by providing an apparatus to obtain a high resolution image, the apparatus including a region dividing unit to divide a input image frame into a background region and a foreground region, a first image frame obtaining unit to obtain a first high resolution image frame with respect to the background region, a second image frame obtaining unit to obtain a second high resolution image frame with respect to the foreground region, and an image frame compositing unit to composite the first high resolution image frame and the second high resolution image frame to obtain a high resolution image frame with respect to the input image frame.

The foregoing and/or other aspects are achieved by providing an apparatus to obtain a high resolution image further including a database, the database generating a first transform coefficient block group and a second transform coefficient block group, the first transform coefficient block group being a wavelet transform coefficient of a low resolution image frame with respect to a reference image divided by first block units and the second transform coefficient block group being a wavelet transform coefficient of a high resolution image frame with respect to the reference image divided by second block units, matching a plurality of first transform coefficient blocks included in the first transform coefficient block group with a plurality of second transform coefficient blocks included in the second transform coefficient block group according to a location of the first transform coefficient block and the second transform coefficient block in the reference image, and storing the matched first and second transform coefficient blocks in a database.

The foregoing and/or other aspects are achieved by providing a method of obtaining a high resolution image frame, the method including dividing an input image frame into a background region and a foreground region, obtaining a first high resolution image frame with respect to the background region, obtaining a second high resolution image frame with respect to the foreground region, and obtaining a high resolution image frame with respect to the input image frame through compositing the first high resolution image frame and the second high resolution frame image.

The foregoing and/or other aspects are achieved by providing a method of obtaining a high resolution image frame, the method including: dividing an input image frame into a background region and a foreground region based on motion information of the input image frame; applying a resolution enhancement algorithm specific for each of the divided background region and the foreground region to obtain high resolution image frames for each of the background region and the foreground region; and compositing the high resolution image frames of the background region and the foreground region to obtain a high resolution image frame with respect to the input image frame.

The resolution enhancement algorithm specific for each of the divided background region and the foreground region may be an algorithm optimal for each of the regions.

The foregoing and/or other aspects are achieved by providing an apparatus to obtain a high resolution image frame, the apparatus including: a region dividing unit dividing an input image frame into a background region and a foreground region based on motion information of the input image frame; a first image frame obtaining unit applying a resolution enhancement algorithm optimal for the divided background region to obtain a first high resolution image frame for the background region; a second image frame obtaining unit applying a resolution enhancement algorithm optimal for the divided foreground region to obtain a second high resolution image frame for the foreground region; and an image frame compositing unit compositing the high resolution image frames of the background region and the foreground region to obtain a high resolution image frame with respect to the input image frame.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages of embodiments will become apparent and more readily appreciated from the following description, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present disclosure by referring to the figures.

Figure 1:
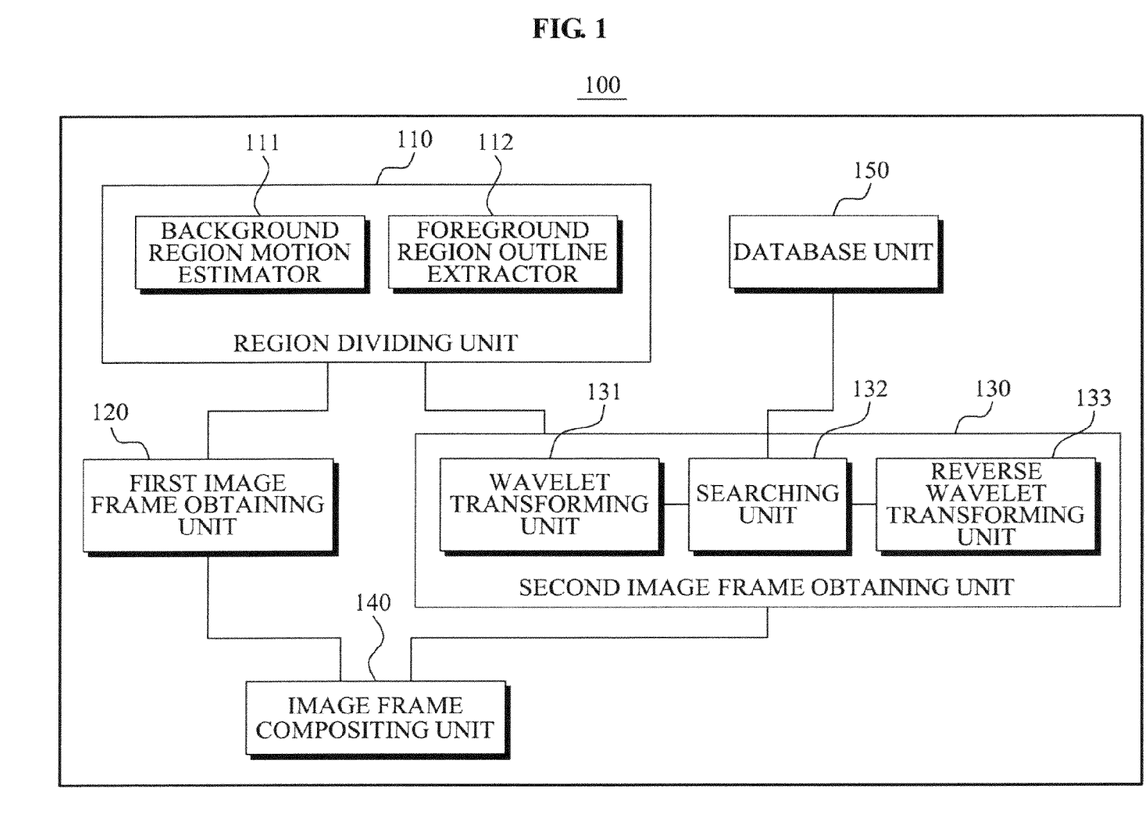
FIG. 1 is a block diagram illustrating a detailed configuration of a high resolution image obtaining apparatus.

FIG. 1 is a block diagram illustrating a detailed configuration of a high resolution image obtaining apparatus.

A high resolution image obtaining apparatus 100 according to the present embodiment includes a region dividing unit 110, a first image frame obtaining unit 120, a second image frame obtaining unit 130, and an image frame compositing unit 140. Also, the high resolution image obtaining apparatus 100 may further include a database unit 150. Hereinafter, a function for each element will be described.

The region dividing unit 110 divides an input image into a background region and a foreground region.

The foreground region is a region including an object movable within the input image frame, and the background region is a remaining region, exclusive of the foreground region, from the input image frame.

According to an embodiment, the region dividing unit 110 may divide the input image frame into the background region and the foreground region based on motion information of the input image frame.

Also, according to an embodiment, the region dividing unit 110 may further include a background region motion estimator 111 and a foreground region outline extractor 112.

The background region motion estimator 111 estimates a motion of the background region using the input image frame and a prior input image frame of the input image frame.

When the input image frame is obtained, a motion in the background region may occur due to movement of an image obtaining apparatus, and the like. In this instance, when the background region and the foreground region are separated, the background region motion estimator 111 approximately estimates the motion of the background region.

According to an embodiment, the background region motion estimator 111 may extract a salient point respectively from the input image frame and the prior input image frame of the input image frame and match the salient point of the input image frame with the salient point of the prior input image frame to extract the motion of the background region.

First, the background region motion estimator 111 performs modeling of the motion of the background region in the input image frame and the prior input image frame using an affine motion.

As an example, the background region motion estimator 111 may extract salient points respectively from the input image frame and the prior input image frame using a Harris corner detector.

After extracting the salient points, the background region motion estimator 111 matches the salient points of the input image frame with the salient points of the prior input image frame. As an example, the background region motion estimator 111 may perform matching of each salient point through measuring a sum of absolute difference (SAD) and normalized cross correlation (NCC).

In this instance, some of the matched salient points may not be included in the background region, but in the foreground region. Accordingly, the salient points included in the foreground region may be eliminated to perform accurate modeling of the motion of the background region. For example, the background region motion estimator 111 may eliminate salient points extracted from the foreground region, through random sample consensus (RANSAC).

After eliminating the salient points extracted from the foreground region, the background motion estimator 111 estimates an affine parameter that minimizes least-square errors and estimates the motion of the background region using the estimated affine parameter.

The foreground region outline extractor 112 corrects the input image frame based on the estimated motion of the background region and extracts an outline of the foreground region using the corrected input image frame and the prior input image frame.

As an example, the foreground region outline extractor 112 may estimate the foreground region using a subtraction image frame between the input image frame and the corrected input image frame. The subtraction image frame is an image frame having a pixel value equal to a difference between a pixel value of the input image frame and a pixel value of the corrected input image frame.

Since the corrected input image frame is an image frame in which the motion of the background region is corrected, if a specific pixel value of the subtraction image frame is excessively higher than neighboring pixel values, the pixel value may be verified not to be included in the background region, but included in the foreground region. Accordingly, based on a predetermined threshold value, the foreground region outline extractor 112 may assign "1" when the pixel value of the subtraction image frame exceeds the threshold, otherwise, the foreground region outline extractor 112 may assign "0", thereby binarizing the subtraction image frame. In this instance, the foreground region extractor 112 may estimate a region having a pixel value "1" from the binarized subtraction image frame as the foreground region.

In this instance, when there is no texture in the foreground region, a pixel value inside the foreground region is "0". Thus, an entire foreground region is not detected, but only the outline of the foreground region is detected. In this instance, the foreground region outline extractor 112 may apply morphological filtering with respect to the binarized subtraction image and assign a pixel value "1" with respect to a pixel of the inside region together with maintaining the outline, thereby extracting a foreground region in a closed format.

Also, according to the present embodiment, the foreground region outline extractor 112 may finely divide the foreground region and the background region using a color distribution difference between the extracted foreground region and the background region. In this instance, the foreground region outline extractor 112 may finely divide the foreground region and background region using a GrabCut algorithm.

The first image frame obtaining unit 120 obtains a first high resolution image frame with respect to the divided background region, and the second image frame obtaining unit 130 obtains a second high resolution image frame with respect to the divided foreground region.

That is, the high resolution obtaining apparatus 100 according to an embodiment may divide the input image frame into the background region and the foreground region and apply a resolution enhancement algorithm optimal for each divided region to the divided background region and foreground region, thereby effectively obtaining a high resolution image frame with respect to the input image frame.

According to an example embodiment, the first image frame obtaining unit 120 may obtain the first high resolution image frame using a reconstruction-based resolution enhancement algorithm.

The reconstruction-based high resolution image enhancement algorithm may obtain a high resolution image from a plurality of low resolution images through modeling a relation between the high resolution image and the low resolution image.

Here, it is assumed that a size of the input image is N1×N2, a size of a high resolution image desired to be obtained is L1N1×L2N2, and a vector that lexicographically arranges the high resolution image desired to be obtained is x.

The low resolution image may be modeled as an image in which x is warped to be blurred and a width and a height are respectively sub-sampled as much as L1 and N2. The warping represents a spatial relation between the high resolution image and the low resolution image, and mainly considers translation, rotation, and scaling. The blur represents an optical blur of a lens occurring when an image is obtained, a sensor blur due to the CCD, and a motion blur. The sub-sampling is a ratio of resolution between the high resolution image and low resolution image.

The modeling may be formulated as shown in Equation 1 below.

$$y_k = D_k B_k R_k x + n_k \quad \text{[Equation 1]}$$
$$= W_k x + n_k,$$
$$\text{for } 1 \le k \le p$$

Here, p is a number of a plurality of low resolution images, Dk is a kth sub-sampling parameter, Bk is a kth blur parameter, Rk is a kth warping (or registration) parameter, Yk is a kth low resolution image, nk is a noise included in the kth low resolution image. Also, a multiplication of Dk, Bk, and Rk may simply be represented as Wk.

Where a relation between the low resolution image and the high resolution image is as shown in Equation 1, the first image frame obtaining unit 120 may obtain the first high resolution image frame based on Equation 2 below.

$$\hat{x} = \operatorname*{argmin}_{x}(\|y - Wx\|_2^2 + \lambda \|Cx\|_2^2) \quad \text{[Equation 2]}$$

Here, $\hat{x}$ is the first high resolution image frame, $\|y-Wx\|_2^2$ is a similarity cost, $\|Cx\|_2^2$ is a regularization cost, and $\lambda$ is a parameter to adjust a weight of the similarity cost and the regularization cost.

According to the present example embodiment, the second image frame obtaining unit 130 may obtain the second high resolution image frame using an example-based resolution enhancement algorithm based on a wavelet-transform.

The example-based resolution enhancement algorithm generates a database from a plurality of reference images to improve resolution, and obtains a high resolution image frame from input image frames (low resolution image frames) using information stored in the database. In this instance, where the reference image is wavelet-transformed, the wavelet transform coefficient is stored in the database, and then the high resolution image frame is obtained using the wavelet transform coefficient stored in the database, the high resolution image frame may be effectively obtained since edge elements are well expressed due to a characteristic of the wavelet-transform.

As described above, according to the present embodiment, the high resolution image obtaining apparatus 100 may further include a database unit 150.

First, the database unit 150 generates a first transform coefficient block and also generates a second transform coefficient block, the first transform coefficient being a wavelet transform coefficient of a low resolution image frame with respect to a reference image divided by first block units and the second transform coefficient block being a wavelet transform coefficient of a high resolution image frame with respect to the reference image divided by second block units.

That is, the database unit 150 stores a wavelet transform coefficient after wavelet-transforming the reference image, as opposed to storing information with respect to the reference image as is. In this instance, the database unit 150 stores the wavelet transform coefficient in block units as opposed to storing the wavelet transform coefficient in pixel units.

To perform the above, the database unit 150 divides the wavelet transform coefficient of the low resolution image frame with respect to the reference image by first block units and divides the wavelet transform coefficient of the high resolution image frame with respect to the reference image by second block units. In this instance, to store wavelet transform coefficients with respect to a variety of images, the database unit 150 may store wavelet transform coefficients with respect to at least one reference image.

The low resolution image frame with respect to the reference image may be generated by performing a blur or down-sampling the high resolution image frame with respect to the reference image or may be generated through the reference image being separately inputted.

A number of the first transform coefficient blocks divided by the first block units in the first transform coefficient block group and a number of the second transform coefficient blocks divided by the second block units in the second transform coefficient block group may be equal, and the second block unit may be greater than the first block unit since a number of pixels of the high resolution image is generally greater than a number of pixels of the low resolution image.

Next, the database unit 150 may match a plurality of the first transform coefficient blocks with a plurality of the second transform coefficient blocks according to a location of the first transform coefficient blocks and the second transform coefficient blocks in the reference image, and store the same.

That is, the database unit 150 may match and store a first transform coefficient block and a second transform coefficient block that represent the same location in the reference image. For example, the database unit 150 may store the matched first transform coefficient block and the second transform coefficient block as a training data set.

According to the present example embodiment, the wavelet transform coefficient of the low resolution image frame and the wavelet transform coefficient of the high resolution image frame may include at least one wavelet transform coefficient from among a wavelet transform coefficient of a LH-band and a wavelet transform coefficient of a HL-band.

That is, since the wavelet transform coefficient of the HL-band may be obtained through transposing a location of a width and height of the wavelet transform coefficient of the LH-band, the database unit 150 may store any one of the wavelet transform coefficient of the LH-band and the wavelet transform coefficient of the HL-band, to reduce the amount of information to be stored.

According to the present embodiment, the database unit 150 may further store edge angle information of the first transform coefficient block.

Also, as an example, when the first transform block does not express an edge, but expresses a texture, the database unit 150 may not store the edge angle information, but may further store information indicating that the first transform coefficient block is a texture. The information may also be stored in the training data set.

According to the present embodiment, the second image frame obtaining unit 130 may include a wavelet transforming unit 131, a searching unit 132, and a reverse wavelet transforming unit 133.

The wavelet transforming unit 131 wavelet-transforms the foreground region. That is, the wavelet transforming unit 131 wavelet-transforms the foreground region of the low resolution image frame to generate the wavelet transform coefficient.

The searching unit 132 divides a wavelet transform coefficient of the wavelet-transformed foreground region by the first block units to generate a third transform coefficient block group, and searches for first transform coefficient blocks respectively corresponding to each of a plurality of third transform coefficient blocks in the third transform coefficient block group from the database unit 150.

That is, the searching unit 132 divides the wavelet transform coefficient of the wavelet-transformed foreground region in a size equal to the block unit of the first transform coefficient block (the first block unit) to generate the plurality of the third transform coefficient blocks, and searches for first transform coefficient blocks respectively similar to each of the plurality of third transform coefficient blocks from the database unit 150.

The reverse wavelet transforming unit 133 combines the second transform coefficient blocks which are matched with the retrieved first transform coefficient blocks to generate a fourth transform coefficient block group, and performs reverse wavelet-transform of the fourth transform coefficient block group.

When the second transform coefficient blocks which are matched with the retrieved first transform coefficient blocks are combined according to a sequence of the first transform coefficient blocks in the first transform coefficient block group, it may be regarded as the same image as a wavelet-transformed image of the high resolution image frame with respect to the foreground region of the input image frame. The reverse wavelet transforming unit 133 may reverse wavelet-transform the combined the second transform coefficient block group.

Accordingly, the second image frame obtaining unit 130 may obtain the high resolution image frame with respect to the foreground region of the input image frame.

That is, according to the present example embodiment, the high resolution image obtaining apparatus 100 selects advantages of the reconstruction-based resolution enhancement algorithm and the example-based resolution enhancement algorithm and applies both at the same time, thereby reducing complexity and effectively obtaining the high resolution image from the low resolution image.

Hereinafter, a process of searching for a fourth transform coefficient block corresponding to a third transform coefficient block will be described referring to FIG. 4.

Figure 4:
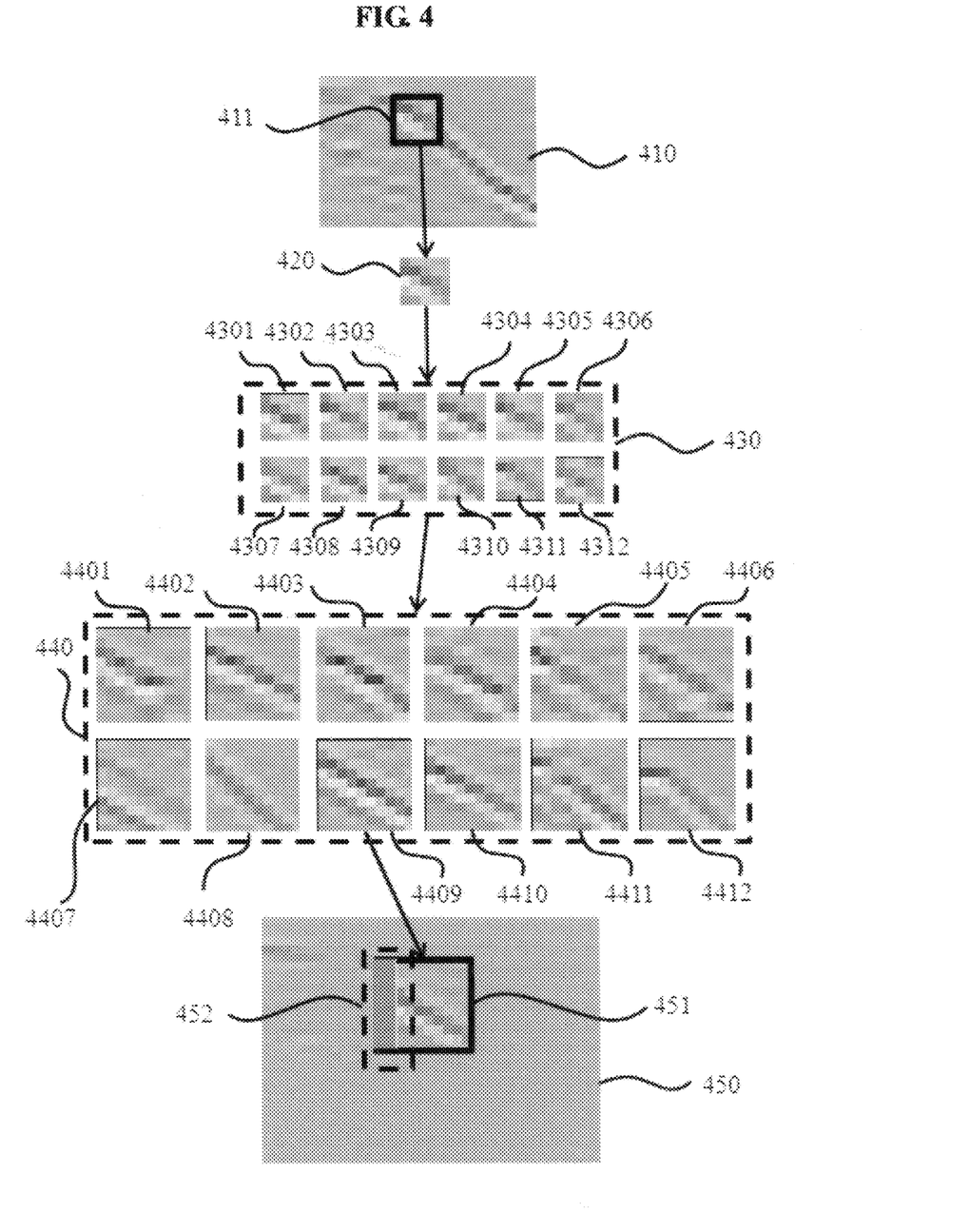
FIG. 4 illustrates a process of searching for a fourth transform coefficient block matched to a third transform coefficient block according to an embodiment.

FIG. 4 illustrating the process of searching for the fourth transform coefficient block matched to the third transform coefficient block according to the present embodiment.

As an example, in FIG. 4, it is assumed that the first transform coefficient block and the second transform coefficient block are a normalized first transform coefficient block and a normalized second transform coefficient block. Normalizing the first transform coefficient block and the second transform coefficient block to be stored in a database may reduce the amount of information to be stored.

First, a third transform coefficient block 411 included in a partial region 410 of a wavelet-transformed input image frame is extracted and a normalized third transform coefficient block is generated 420.

Next, a normalized first transform coefficient block similar to the normalized third transform coefficient block 420 is retrieved and first candidates 430 are generated.

Next, second candidates 440 are generated through retrieving normalized second transform coefficient blocks 4401 to 4412 respectively matched to a plurality of normalized first transform coefficient blocks 4301 to 4312 included in the first transform coefficient block candidates 430.

Also, considering a compatibility with a neighboring block, a single normalized second transform coefficient block 4409 is selected from among the second candidates 440 and the selected block is denormalized to generate a fourth transform coefficient block 451 corresponding to the third transform coefficient block 411. A region 452 indicates an area overlapped with a prior block.

Figure 2:
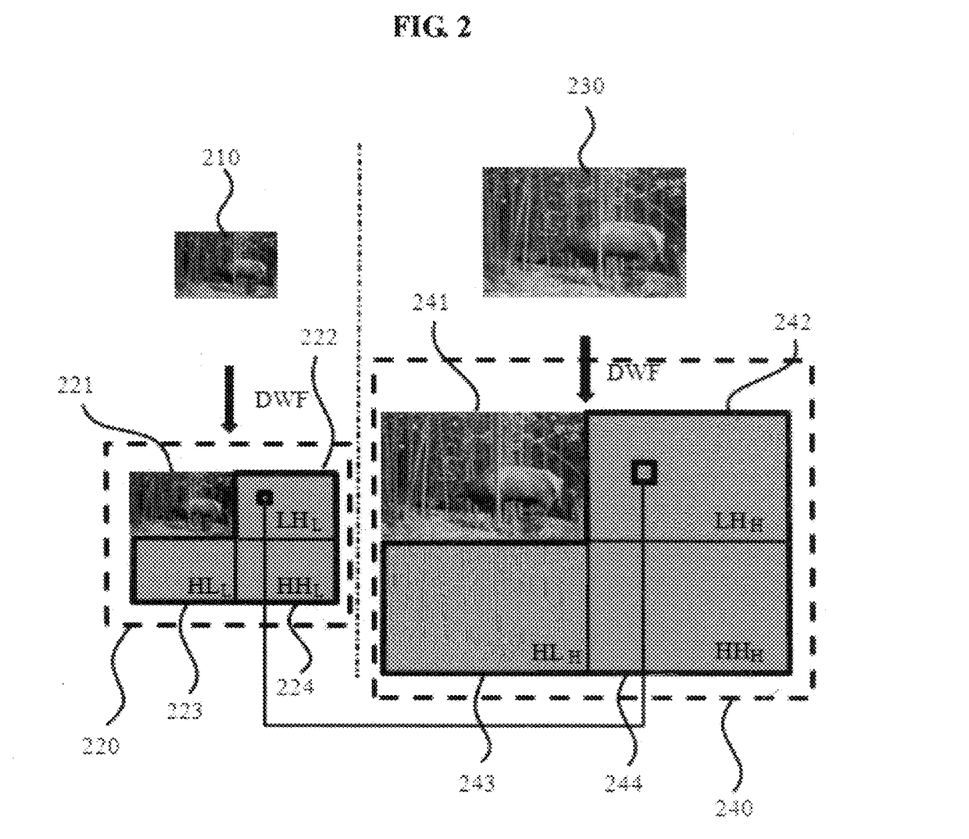
FIG. 2 illustrates a process of storing a wavelet transform coefficient in a database according to an embodiment.

FIG. 2 illustrates a process of storing a wavelet transform coefficient in a database according to an embodiment.

As an example, generating the database using a discrete wavelet frame transform is illustrated in FIG. 2.

First, the database unit 150 performs discrete wavelet frame transform of an inputted low resolution image frame 210 and a high resolution image frame 230 with respect to the reference image to obtain a wavelet frame-transformed low resolution image frame 220 and a wavelet frame-transformed high resolution image frame 240. The wavelet frame-transformed low resolution image frame 220 includes an LL-band 221, an LH-band 222, an HL-band 223, and an HH-band 224, and the wavelet frame-transformed high resolution image frame 240 includes an LL-band 241, an LH-band 242, an HL-band 243, and an HH-band 244.

Next, the database unit 150 divides the wavelet frame-transformed low resolution image frame 220 by first block units and generates the first transform coefficient block group, and the database unit 150 divides the wavelet frame-transformed high resolution image frame 240 by second block units and generates the second transform coefficient block group. Then, the database unit 150 matches the first transform coefficient blocks in the first transform coefficient block group with the second transform coefficient blocks in the second transform coefficient block group according to a location of a first transform coefficient block and a second transform coefficient block in the reference image and stores the matched first and second transform coefficient blocks in a database.

To improve resolution of a low resolution image, a high frequency element may be utilized. Therefore, according to the present embodiment, the database unit 150 may store wavelet transform coefficients included in the LH-bands 222 and 242, the HL-bands 223 and 243, and the HH-bands 224 and 244, excluding the LL-bands 221 and 241.

Also, according to the present embodiment, the database unit 150 may only store wavelet transform coefficients included in the LH-bands 222 and 242 and the HL-bands 223 and 243 since a wavelet transform coefficient of the HH-bands 224 and 244 may not be used to improve the resolution.

Also, since the wavelet transform coefficient of the HL-bands 223 and 243 may be obtained through transposing a location of a width and height of the wavelet transform coefficient of the LH-bands 222 and 242, according to the present embodiment, the database unit 150 may store any one of the wavelet transform coefficient of the LH-bands 222 and 242 and the wavelet transform coefficient of the HL-bands 223 and 243.

A training data set may further include information indicating whether the first transform coefficient block is about an edge or is a texture, and when the first transform coefficient block is about the edge, the training data set may further include edge angle information.

Hereinafter, an example of a process of obtaining the edge angle information of the first transform coefficient block included in the training data set will be described.

When a pixel value of each pixel in the first transform coefficient block is assumed to be I(i, j), a structure matrix is defined as Equation 3 below.

$$M_1 = \begin{pmatrix} I_x^2(i, j) & I_x(i, j)I_y(i, j) \\ I_x(i, j)I_y(i, j) & I_y^2(i, j) \end{pmatrix} \quad \text{[Equation 3]}$$

Here, $I_x(i, j)$ is a gradient in the x (width) direction, and $I_y(i, j)$ is a gradient in the y (height) direction.

When blurring is performed with regard to Equation 3 to eliminate noise included in an input image, Equation 4 may be formulated as below.

$$M_2 = \begin{pmatrix} K_p I_x^2(i, j) & K_p I_x(i, j)I_y(i, j) \\ K_p I_x(i, j)I_y(i, j) & K_p I_y^2(i, j) \end{pmatrix} \quad \text{[Equation 4]}$$

Here, Kp is a blur parameter.

When an eigenvalue decomposition is performed with respect to the structure matrix M2, a direction vector vertical to the edge and a direction vector parallel to the edge may be obtained, and an angle of the pixel may be determined as the direction vector parallel to the edge.

After determining the angle with respect to each pixel as described above, the database unit 150 classifies pixels based on a specific angle (for example, 10 degrees) with respect to each first transform coefficient block. In this instance, when distribution of angles is concentrated on a certain angle in a histogram, the first transform coefficient block is verified to be about the edge. Then the certain angle is determined as a representative angle of the block and stored. When the distribution of angles is irregular in the histogram, the first transform coefficient block is verified to be about the texture and information thereof is stored.

Figure 3:
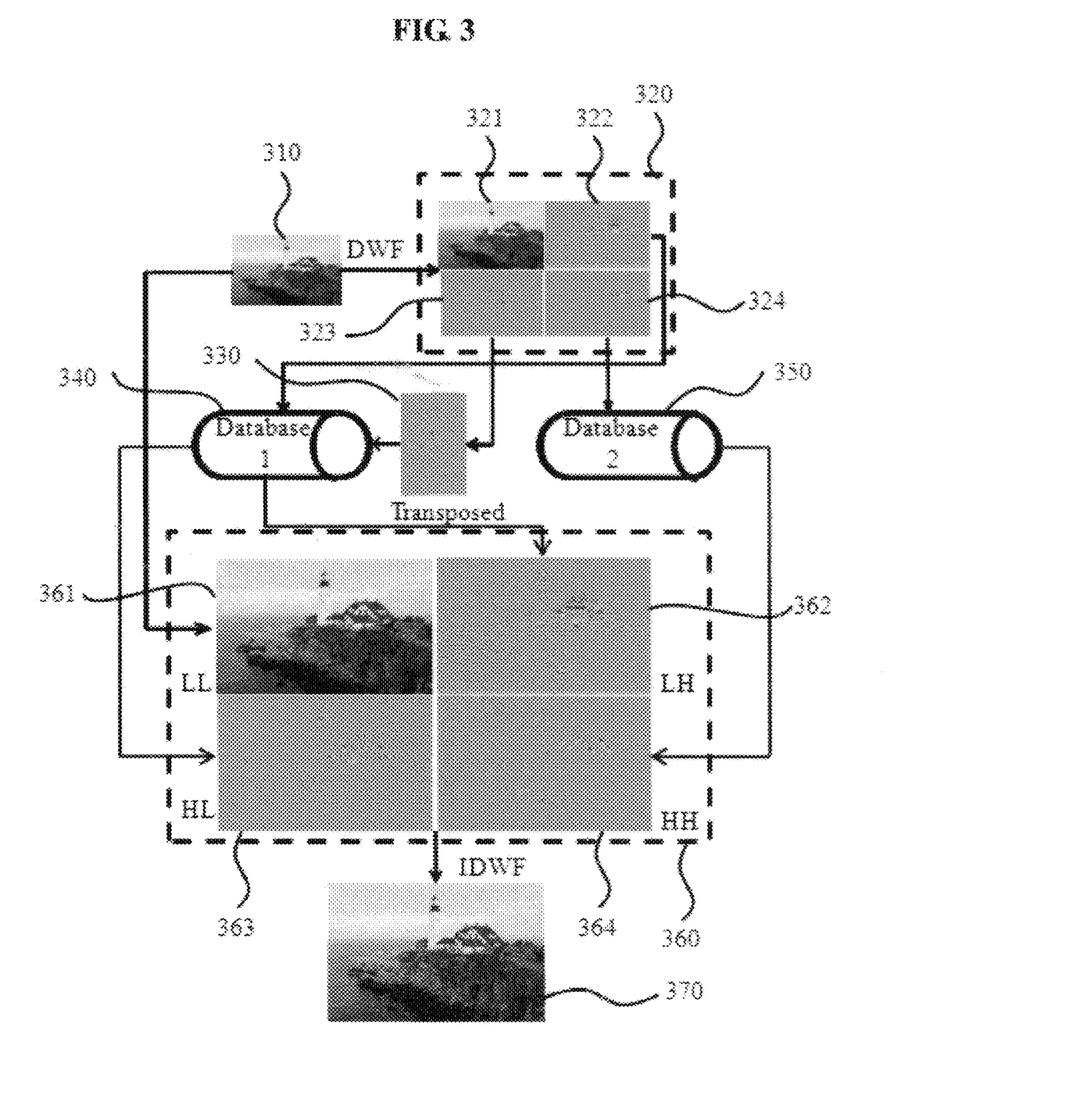
FIG. 3 illustrates a process of obtaining a high resolution image using an example-based resolution enhancement algorithm based on a wavelet-transform according to an embodiment.

FIG. 3 illustrates a process of obtaining a high resolution image using an example-based resolution enhancement algorithm based on a wavelet-transform according to an embodiment.

As an example, FIG. 3 illustrates a process of obtaining the high resolution image using an example-based resolution enhancement algorithm based on a discrete wavelet frame transform.

Also, FIG. 3 illustrates a case that the database unit 150 only stores information for the LH-band and information for the HH-band.

First, a low resolution input image frame 310 is wavelet frame-transformed, and thus, a wavelet frame-transformed low resolution image frame 320 is obtained. The wavelet frame-transformed low resolution image frame 320 includes an LL-band 321, an LH-band 322, an HL-band 323, and an HH-band 324.

Next, a wavelet frame-transformed high resolution image frame 360 corresponding to the wavelet frame-transformed low resolution image frame 320 is obtained using the stored information in the database unit 150.

An LL-band 361 of the high resolution image frame 360 may be obtained using the low resolution image frame 320.

First transform coefficient blocks corresponding to third transform coefficient blocks of the LH-band 322 of the low resolution image frame 320 are retrieved from a database (1) 340 storing information with respect to the LH-band 322, and second transform coefficient blocks which are matched with the retrieved first transform coefficient blocks are combined, and thus, an LH-band 362 of the high resolution image frame 360 is generated.

Also, in the case of third transform coefficient blocks of the HL-band 323 of the low resolution image frame 320, a transposed image 330 in which a width and a height are transposed is generated. First transform coefficient blocks corresponding to third transform coefficient blocks of the transposed image 330 are retrieved from the database (1) 340. Second coefficient transform blocks which are matched with the retrieved first transform coefficient blocks are combined and the HL-band 363 of the high resolution image frame 360 is generated.

Also, first coefficient transform blocks corresponding to third transform coefficient blocks of the HH-band 324 of the low resolution image frame 320 are retrieved from a database (2) 350 storing information with respect to the HH-band, and second transform coefficient blocks which are matched with the retrieved first transform coefficient blocks are combined, and thus, an HH-band 364 of the high resolution image frame 360 is generated.

As an example, the HH-band 364 of the high resolution image frame 360 may also be generated through assigning "0" to every pixel as well as through using the database (2) 350.

Also, the wavelet frame-transformed high resolution image frame 360 is reverse wavelet frame-transformed, and a high resolution output image frame 370 with respect to the low resolution input image frame 310 is obtained.

Figure 5:
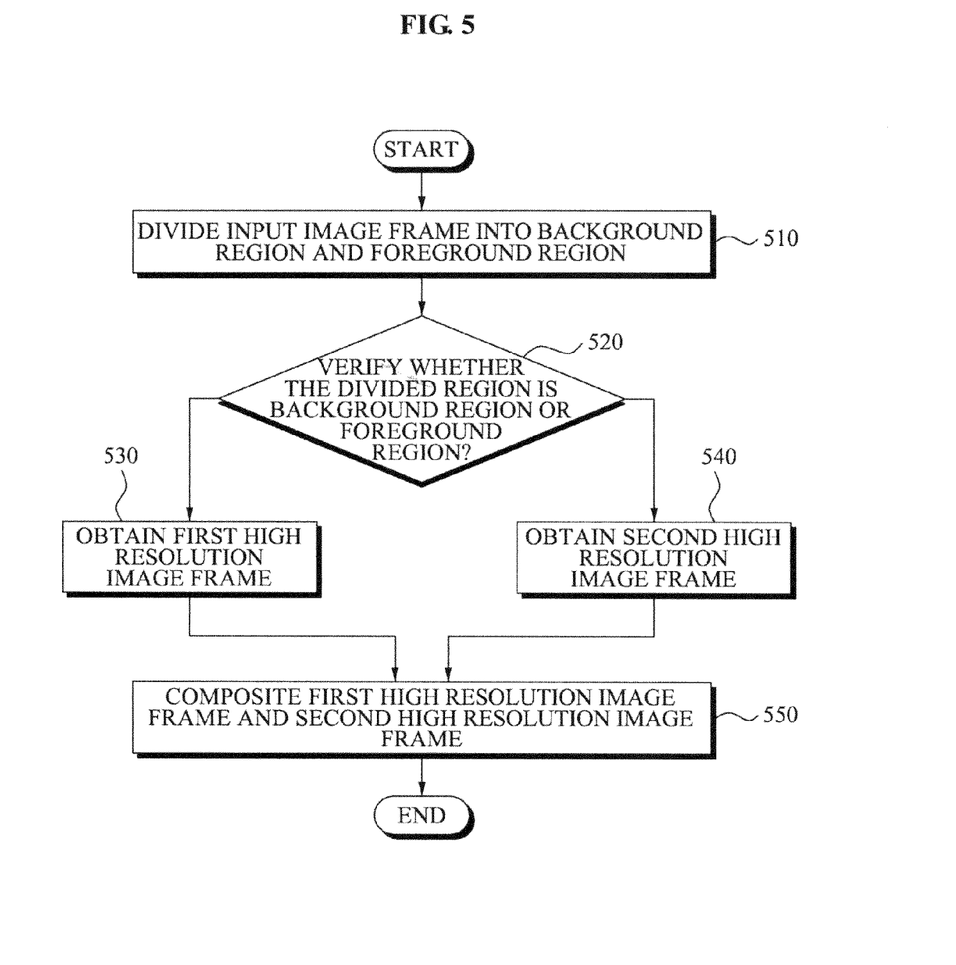
FIGS. 5 and 6 are flowcharts illustrating a method of obtaining a high resolution image according to an embodiment.
Figure 6:
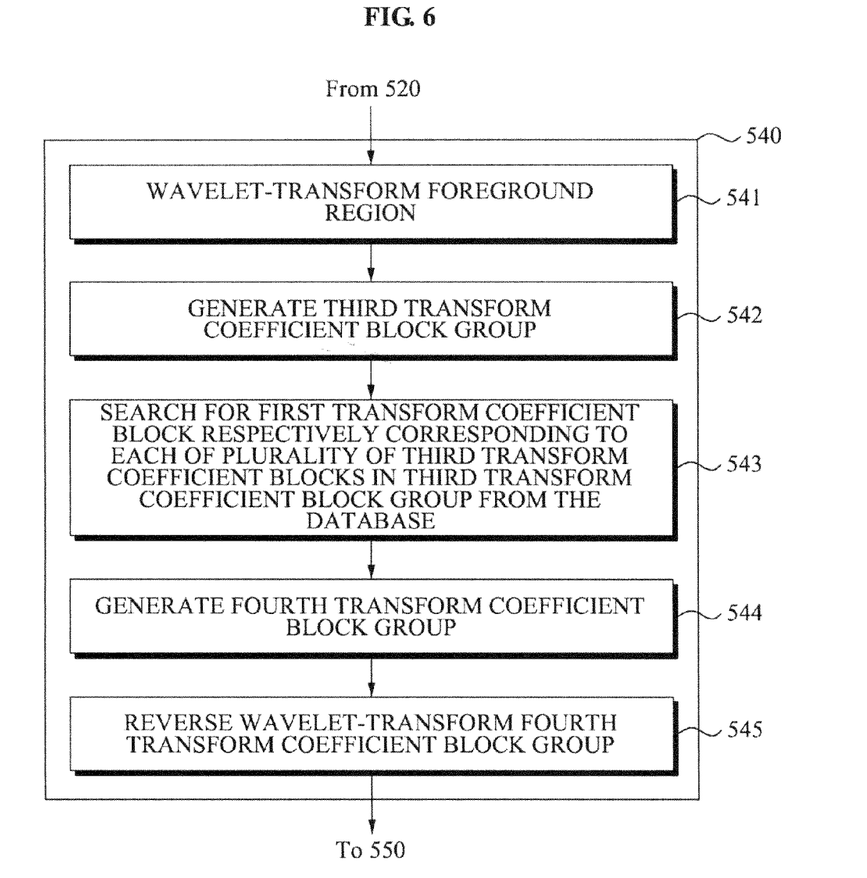

FIGS. 5 and 6 are flowcharts illustrating a method of obtaining a high resolution image according to an embodiment. Hereinafter, processes performed in each operation will be described referring to FIGS. 5 and 6.

First, an input image frame is divided into a background region and foreground region in operation 510.

According to the present embodiment, the input image frame is divided into the background region and foreground region based on motion information of the input image frame in operation 510.

Whether the divided region is the background region and foreground region is verified in operation 520.

When the divided region is verified to be the background region in operation 520, a first high resolution image frame with respect to the background region is obtained in operation 530.

According to the present example embodiment, the first high resolution image frame is obtained using a reconstruction-based resolution enhancement algorithm.

When the divided region is verified to be the foreground region in operation 520, a second high resolution image frame with respect to the foreground is obtained in operation 540.

According to the present example embodiment, the second high resolution image frame is obtained using an example-based high resolution enhancement algorithm based on a wavelet transform in operation 540.

According to the present embodiment, a high resolution obtaining method may further include generating a first transform coefficient block group and a second transform coefficient block group (not illustrated), the first transform coefficient block group being a wavelet transform coefficient of a low resolution image frame with respect to a reference image divided by first block units and the second transform coefficient block group being a wavelet transform coefficient of a high resolution image frame with respect to the reference image divided by second block units, and matching a plurality of first transform coefficient blocks included in the first transform coefficient block group with a plurality of second transform coefficient blocks included in the second transform coefficient block group according to a location of the first transform coefficient block and the second transform coefficient block in the reference image so that the matched first and second transform coefficient blocks are stored in a database (not illustrated). This operation generates a database to provide examples of when the second high resolution image frame is obtained using the example-based resolution enhancement algorithm based on the wavelet transform in operation 540.

Also, according to the present embodiment, the operation of storing in the database may further include an operation of storing edge angle information of the first transform coefficient blocks. This is merely for convenience of information retrieval from the database and other embodiments are possible.

Hereinafter, a process of obtaining the second high resolution image in operation 540 will be described referring to FIG. 6.

Referring to FIG. 6, a foreground region is wavelet-transformed in operation 541, and a wavelet transform coefficient of the wavelet-transformed foreground region is divided by first block units to generate a third transform coefficient block group in operation 542. A size of the first transform coefficient block group and a size of the third transform coefficient block group are the same.

A first transform coefficient block respectively corresponding to each of a plurality of third transform coefficient blocks in the third transform coefficient block group is retrieved from the database in operation 543. Also, second transform coefficient blocks which are matched with the retrieved first transform coefficient blocks are combined, and thus, a fourth transform coefficient block group is generated in operation 544. The fourth transform coefficient block group corresponds to a wavelet-transformed high resolution image with respect to the foreground region.

The fourth transform coefficient block group is reverse wavelet-transformed in operation 545. The reverse wavelet-transformed fourth transform coefficient block group is a high resolution image frame with respect to the foreground region.

Referring to FIG. 5 again, the high resolution image frame with respect to the input image frame is obtained through compositing the first high resolution image frame and the second high resolution image frame.

That is, the high resolution image frame with respect to the background region obtained in operation 530 and the high resolution image frame with respect to the foreground region obtained in operation 540 are summed and a high resolution image frame with respect to an entire input image is obtained in operation 550.

Embodiments with respect to high resolution image obtaining method have been shown and described, and a configuration of the high resolution image obtaining apparatus described in FIG. 1 is also applicable to the present embodiment, thus a detailed description thereof is omitted.

The methods described above including a high resolution image obtaining method may be recorded, stored, or fixed in one or more computer-readable media that includes program instructions to be implemented by a computer to cause a processor to execute or perform the program instructions. The media may also include, alone or in combination with the program instructions, data files, data structures, etc. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, etc. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments have been shown and described, the present disclosure is not limited to the described embodiments. Instead, it would be appreciated by those skilled in the art that changes may be made to these embodiments without departing from the principles and spirit of the disclosure, the scope of which is defined by the claims and their equivalents.

What is claimed is:

1. An apparatus to obtain a high resolution image, the apparatus comprising:
    a processor;
    a region dividing unit to divide an input image frame into a background region and a foreground region based on motion information of the input image frame;
    a first image frame obtaining unit to obtain a first high resolution image frame with respect to the background region, using a reconstruction-based resolution enhancement algorithm based on a reconstruction;
    a second image frame obtaining unit to obtain a second high resolution image frame with respect to the foreground region, using an example-based resolution enhancement algorithm based on a wavelet-transform; and an image frame compositing unit to composite the first high resolution image frame and the second high resolution image frame to obtain a high resolution image frame with respect to the input image frame, wherein at least one of the region dividing unit, first image frame obtaining unit, second image frame obtaining unit, and image frame compositing unit use the processor to obtain the first high resolution image frame, to obtain the second high resolution image frame, or to composite the first high resolution image frame and the second high resolution image frame.

2. The apparatus of claim 1, wherein the region dividing unit comprises:
a background region motion estimator to estimate a motion of the background region using the input image frame and a prior input image frame of the input image frame; and
a foreground region outline extractor to correct the input image frame based on the estimated motion of the background region and to extract an outline of the foreground region using the corrected input image frame and the prior input image frame,
wherein the region dividing unit separates the background region and the foreground region using the outline of the foreground region as a boundary line.

3. The apparatus of claim 2, wherein the background region motion estimator extracts a salient point respectively from the input image frame and the prior input image frame of the input image frame, and matches the salient point of the input image frame with the salient point of the prior input image frame of the input image frame to estimate the motion of the background region.

4. The apparatus of claim 1, further comprising a database to generate a first transform coefficient block group and a second transform coefficient block group, the first transform coefficient block group being a wavelet transform coefficient of a low resolution image frame with respect to a reference image divided by first block units and the second transform coefficient block group being a wavelet transform coefficient of a high resolution image frame with respect to the reference image divided by second block units, to match a plurality of first transform coefficient blocks included in the first transform coefficient block group with a plurality of second transform coefficient blocks included in the second transform coefficient block group according to a location of a first transform coefficient block and a second transform coefficient block in the reference image, and to store the matched first transform coefficient blocks and the second transform coefficient blocks in the database.

5. The apparatus of claim 4, wherein the database further stores edge angle information of the first transform coefficient blocks.

6. An apparatus to obtain a high resolution image, the apparatus comprising:
a processor;
a region dividing unit to divide an input image frame into a background region and a foreground region;
a first image frame obtaining unit to obtain a first high resolution image frame with respect to the background region;
a second image frame obtaining unit to obtain a second high resolution image frame with respect to the foreground region;
an image frame compositing unit to composite the first high resolution image frame and the second high resolution image frame to obtain a high resolution image frame with respect to the input image frame; and
a database to generate a first transform coefficient block group and a second transform coefficient block group, the first transform coefficient block group being a wavelet transform coefficient of a low resolution image frame with respect to a reference image divided by first block units and the second transform coefficient block group being a wavelet transform coefficient of a high resolution image frame with respect to the reference image divided by second block units, to match a plurality of first transform coefficient blocks included in the first transform coefficient block group with a plurality of second transform coefficient blocks included in the second transform coefficient block group according to a location of a first transform coefficient block and a second transform coefficient block in the reference image, and to store the matched first transform coefficient blocks and the second transform coefficient blocks in the database, wherein the second image frame obtaining unit comprises:
a wavelet transforming unit to perform a wavelet-transform of the foreground region;
a searching unit to divide a wavelet transform coefficient of the wavelet-transformed foreground region by the first block units to generate a third transform coefficient block group, and to search for first transform coefficient blocks respectively corresponding to each of a plurality of third transform coefficient blocks in the third transform coefficient block group from the database; and
a reverse wavelet transforming unit to combine second transform coefficient blocks which are matched with the retrieved first transform coefficient blocks to generate a fourth transform coefficient block group, and to perform a reverse wavelet-transform of the fourth transform coefficient block group, wherein at least one of the region dividing unit, first image frame obtaining unit, second image frame obtaining unit, and image frame compositing unit use the processor to obtain the first high resolution image frame, to obtain the second high resolution image frame, or to composite the first high resolution image frame and the second high resolution image frame.

7. The apparatus of claim 4, wherein the wavelet transform coefficient of the low resolution image frame and the wavelet transform coefficient of the high resolution image frame include at least one wavelet transform coefficient from among a wavelet transform coefficient of an LH-band and a wavelet transform coefficient of an HL-band.

8. A method of obtaining a high resolution image frame, the method comprising:
dividing an input image frame into a background region and a foreground region, based on motion information of the input image frame;
obtaining a first high resolution image frame with respect to the background region, using a reconstruction-based resolution enhancement algorithm based on a reconstruction;
obtaining a second high resolution image frame with respect to the foreground region, using an example-based resolution enhancement algorithm based on a wavelet-transform; and
obtaining the high resolution image frame with respect to the input image frame through compositing the first high resolution image frame and the second high resolution frame image.

9. The method of claim 8, further comprising:
generating a first transform coefficient block group and a second transform coefficient block group, the first transform coefficient block group being a wavelet transform coefficient of a low resolution image frame with respect to a reference image divided by the first block units and the second transform coefficient block group being a wavelet transform coefficient of a high resolution image frame with respect to the reference image divided by the second block units; and matching a plurality of first transform coefficient blocks included in the first transform coefficient block group with a plurality of second transform coefficient blocks included in the second transform coefficient block group according to a location of a first transform coefficient block and a second transform coefficient block in the reference image, and storing the matched first transform coefficient blocks and the second transform coefficient blocks in a database.

10. The method of claim 9, wherein the storing further comprises storing edge angle information of the first transform coefficient block.

11. A method of obtaining a high resolution image frame, the method comprising:

dividing an input image frame into a background region and a foreground region;

obtaining a first high resolution image frame with respect to the background region;

obtaining a second high resolution image frame with respect to the foreground region;

obtaining the high resolution image frame with respect to the input image frame through compositing the first high resolution image frame and the second high resolution frame image;

generating a first transform coefficient block group and a second transform coefficient block group, the first transform coefficient block group being a wavelet transform coefficient of a low resolution image frame with respect to a reference image divided by the first block units and the second transform coefficient block group being a wavelet transform coefficient of a high resolution image frame with respect to the reference image divided by the second block units;

matching a plurality of first transform coefficient blocks included in the first transform coefficient block group with a plurality of second transform coefficient blocks included in the second transform coefficient block group according to a location of a first transform coefficient block and a second transform coefficient block in the reference image; and storing the matched first transform coefficient blocks, the second transform coefficient blocks, and edge angle information of the first transform coefficient block, in a database, wherein the obtaining of the second high resolution image frame comprises:

performing wavelet-transform of the foreground region;

generating a third transform coefficient group through dividing a wavelet transform coefficient of the wavelet-transformed foreground region by the first block units;

searching for first transform coefficient blocks respectively corresponding to each of a plurality of third transform coefficient blocks in the third transform coefficient block group from the database;

generating a fourth transform coefficient block group through combining the second transform coefficient blocks which are matched with the retrieved first transform coefficient blocks; and performing a reverse wavelet-transform of the fourth transform coefficient block group.

12. A non-transitory computer readable recording media storing a program to cause a processor to implement a method of obtaining a high resolution image frame, the method comprising:

dividing an input image frame into a background region and a foreground region, based on motion information of the input image frame;

obtaining a first high resolution image frame with respect to the background region, using a reconstruction-based resolution enhancement algorithm based on a reconstruction;

obtaining a second high resolution image frame with respect to the foreground region, using an example-based resolution enhancement algorithm based on a wavelet-transform; and obtaining the high resolution image frame with respect to the input image frame through compositing the first high resolution image frame and the second high resolution frame image.

13. A method of obtaining a high resolution image frame, the method comprising:

dividing an input image frame into a background region and a foreground region based on motion information of the input image frame;

applying a resolution enhancement algorithm specific for each of the divided background region and the foreground region to obtain high resolution image frames for each of the background region and the foreground region; and compositing the high resolution image frames of the background region and the foreground region to obtain a high resolution image frame with respect to the input image frame, wherein a reconstruction-based resolution enhancement algorithm based on a reconstruction is used for the background region and an example-based resolution enhancement algorithm based on a wavelet-transform is used for the foreground region.

14. The method according to claim 13, wherein the resolution enhancement algorithm specific for each of the divided background region and the foreground region is an algorithm optimal for each of the regions.

15. An apparatus to obtain a high resolution image frame, the apparatus comprising:

a processor;

a region dividing unit to divide an input image frame into a background region and a foreground region based on motion information of the input image frame;

a first image frame obtaining unit to apply a reconstruction-based resolution enhancement algorithm based on a reconstruction optimal for the divided background region to obtain a first high resolution image frame for the background region;

a second image frame obtaining unit to apply an example-based resolution enhancement algorithm based on a wavelet-transform optimal for the divided foreground region to obtain a second high resolution image frame for the foreground region; and an image frame compositing unit to composite the high resolution image frames of the background region and the foreground region to obtain a high resolution image frame with respect to the input image frame, wherein at least one of the region dividing unit, first image frame obtaining unit, second image frame obtaining unit, and image frame compositing unit use the processor to obtain the first high resolution image frame, to obtain the second high resolution image frame, or to composite the first high resolution image frame and the second high resolution image frame.

\* \* \* \* \*